(12) United States Patent
Mori et al.

(10) Patent No.: US 12,204,134 B2
(45) Date of Patent: Jan. 21, 2025

(54) DISPLAY DEVICE

(71) Applicant: Panasonic Intellectual Property Management Co., Ltd., Osaka (JP)

(72) Inventors: Toshiya Mori, Osaka (JP); Ken'ichi Kasazumi, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 230 days.

(21) Appl. No.: 17/951,868

(22) Filed: Sep. 23, 2022

(65) Prior Publication Data

US 2023/0018634 A1  Jan. 19, 2023

Related U.S. Application Data

(63) Continuation of application No. PCT/JP2021/001118, filed on Jan. 14, 2021.

(30) Foreign Application Priority Data

Mar. 30, 2020  (JP) ................. 2020-060386

(51) Int. Cl.
*G02B 27/01* (2006.01)
*F21V 8/00* (2006.01)
(Continued)

(52) U.S. Cl.
CPC ......... *G02B 6/0035* (2013.01); *G02B 6/0023* (2013.01); *G02B 27/0103* (2013.01); *B60K 35/00* (2013.01); *B60K 35/23* (2024.01)

(58) Field of Classification Search
CPC . G02B 27/0103; G02B 6/0023; G02B 6/0035
See application file for complete search history.

(56) References Cited

U.S. PATENT DOCUMENTS 10,156,778 B2 * 12/2018 Shinohara .............. G02B 27/30
2007/0188837 A1  8/2007 Shimizu et al.
(Continued)

FOREIGN PATENT DOCUMENTS

JP  2007-219106  8/2007
JP  2016-181006  10/2016
(Continued)

OTHER PUBLICATIONS

International Search Report (ISR) from International Searching Authority (Japan Patent Office) in International Pat. Appl. No. PCT/JP2021/001118, dated Mar. 23, 2021, together with an English language translation.

*Primary Examiner* — Sung H Pak
(74) *Attorney, Agent, or Firm* — Greenblum and Bernstein, P.L.C.

(57) ABSTRACT

A light guide body in a display device includes a first incident surface on which an image light is incident, and a second emission surface from which the image light is emitted. The light guide body includes a second emission optical element that diffracts the image light to emit a portion of the image light at a predetermined emission angle every time the image light enters the second emission optical element from a predetermined direction. The image light is diverged by being emitted from the second emission optical element such that the predetermined emission angle varies in accordance with a location in one predetermined region included in a plurality of predetermined regions of the optical element. The degree of divergence varies between the one predetermined region and other predetermined region included in the plurality of predetermined regions in accordance with the location of the virtual image.

8 Claims, 10 Drawing Sheets

(51) Int. Cl.
  *B60K 35/00* (2006.01)
  *B60K 35/23* (2024.01)

(56) References Cited

U.S. PATENT DOCUMENTS

2017/0315358 A1   11/2017  Masuda
2018/0101087 A1*  4/2018   Shinohara ................ G02B 6/00

FOREIGN PATENT DOCUMENTS

| JP | 2021-012255 | 2/2021 |
| WO | 2016/035517 | 3/2016 |
| WO | 2017/146172 | 8/2017 |

* cited by examiner

DISPLAY DEVICE

CROSS REFERENCE TO RELATED APPLICATIONS

This is a continuation application of PCT International Application No. PCT/JP2021/001118 filed on Jan. 14, 2021, designating the United States of America, which is based on and claims priority of Japanese Patent Application No. 2020-060386 filed on Mar. 30, 2020.

FIELD

The present disclosure relates to display devices.

BACKGROUND

Patent Literature (PTL) 1 discloses a luminous flux diameter magnifying optical element that includes: a light source that emits light; a display element that modulates the light emitted from the light source, to display a video; a light guide member including flat planes that are two planes facing each other and parallel to each other; and a plurality of holographic diffractive optical elements of volume phase type that are held at different locations on the planes of the light guide member. The plurality of holographic diffractive optical elements in the luminous flux diameter magnifying optical element each diffract, at approximately the same angle, light to be emitted outside.

CITATION LIST

Patent Literature

PTL 1: Japanese Unexamined Patent Application Publication No. 2007-219106

SUMMARY

However, a display device according to PTL 1 can be improved upon.

In view of this, the present disclosure provides a display device capable of improving upon the above related art.

A display device according to one aspect of the present disclosure is capable of improving upon the above related art. The display device (i) includes a light guide body and an image light emitter which emits image light that presents an image, and (ii) displays a virtual image which corresponds to the image presented by the image light emitted from the light guide body. The light guide body includes an incident surface which the image light emitted by the image light emitter is incident on, and an emission surface which the image light incident on the incident surface and guided inside the light guide body is emitted from. The light guide body includes an optical element that is disposed along the emission surface and that diffracts the image light to emit a portion of the image light at a predetermined emission angle every time the image light enters the optical element from a predetermined direction. The optical element has a plurality of predetermined regions. The image light is diverged by being emitted from the optical element such that the predetermined emission angle varies in accordance with a location in one predetermined region included in the plurality of predetermined regions of the optical element. The degree of divergence indicating how much the image light is diverged varies between the one predetermined region and other predetermined region included in the plurality of predetermined regions in accordance with a location of the virtual image.

Note that one or more specific aspects of the features described above may be implemented using a system, a method, an integrated circuit, a computer program, or a computer-readable recording medium such as a CD-ROM, or any combination thereof.

According to the display device of the present disclosure, further improvement can be achieved.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1A:
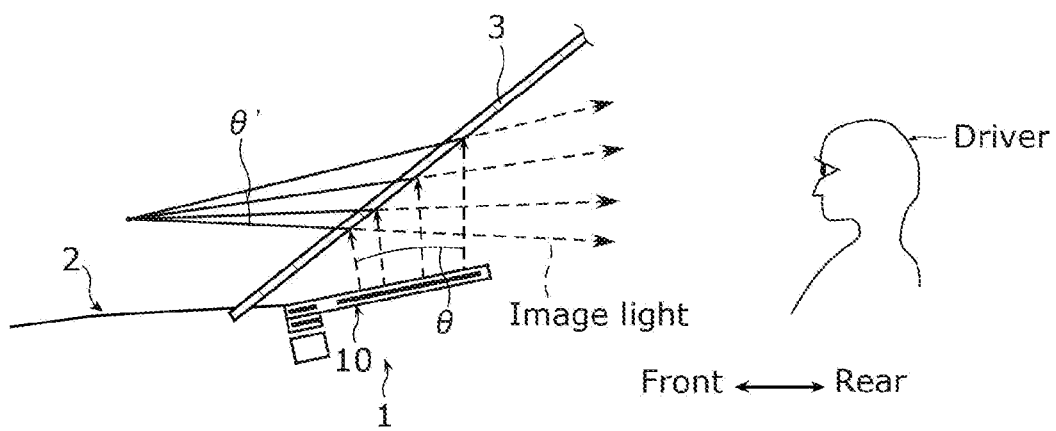
FIG. 1A is a schematic diagram illustrating a display device according to an embodiment and a vehicle when viewed from the side.

An embodiment and others described below each show a generic or specific example of the present disclosure. The numerical values, shapes, materials, elements, the arrangement and connection of the elements, steps, an order of the steps, etc., indicated in the following embodiment and others are mere examples, and therefore are not intended to limit the scope of the present disclosure. Among elements in the following embodiment and others, those not recited in any one of the independent claims are described as optional elements. Any of the aspects from one of the embodiment and others may be combined with any of the aspects from any other of the embodiment and others.

The drawings are presented schematically and are not necessarily precise illustrations. In addition, like components are assigned with like reference signs in the drawings. In the embodiment and others described below, the expression "approximately same" and so on are used. For example, "approximately same" does not only mean being completely same but also means being substantially same, allowing for a difference of a small percentage, for example. Moreover, "approximately same" means being same within a range in which the advantageous effects of the present disclosure can be achieved. The same applies to the other expressions with "approximately".

Hereinafter, a display system according to one aspect of the present disclosure will be described in detail with reference to the drawings.

Embodiment

FIG. 1A is a schematic diagram illustrating display device 1 according to an embodiment and vehicle 2 when viewed from the side.

As illustrated in FIG. 1A, display device 1 is disposed on, for example, the dashboard (also referred to as an instrument panel) of vehicle 2 such as an automobile. Front window 3 (also referred to as a front shield) is disposed above the dashboard of vehicle 2. Light guide body 10 in display device 1 is disposed between the dashboard and front window 3. Front window 3 is one example of a display medium. Light guide body 10 is composed by stacking a plurality of plates, and an optical element is included between a light guide plate having an incident surface and a light guide plate having an emission surface. The configuration of light guide body 10 will be described in detail later.

With image light, which is emitted from light guide body 10 and presents an image, reflecting off front window 3, display device 1 is capable of displaying, to a user who is, for instance, a driver or a passenger, a virtual image which is the image presented by the image light. In other words, display device 1 is a hologram light guide body that projects image light, which is emitted by image light emitter 20 and composes an image, at the front of front window 3 to display the image presented by the image light to the user. The image light is light that presents information in an image including numerals, characters, graphics, etc., and is displayed as the virtual image at the front of front window 3. The image is a still or moving image and includes numerals, characters, graphics, etc.

Figure 2:
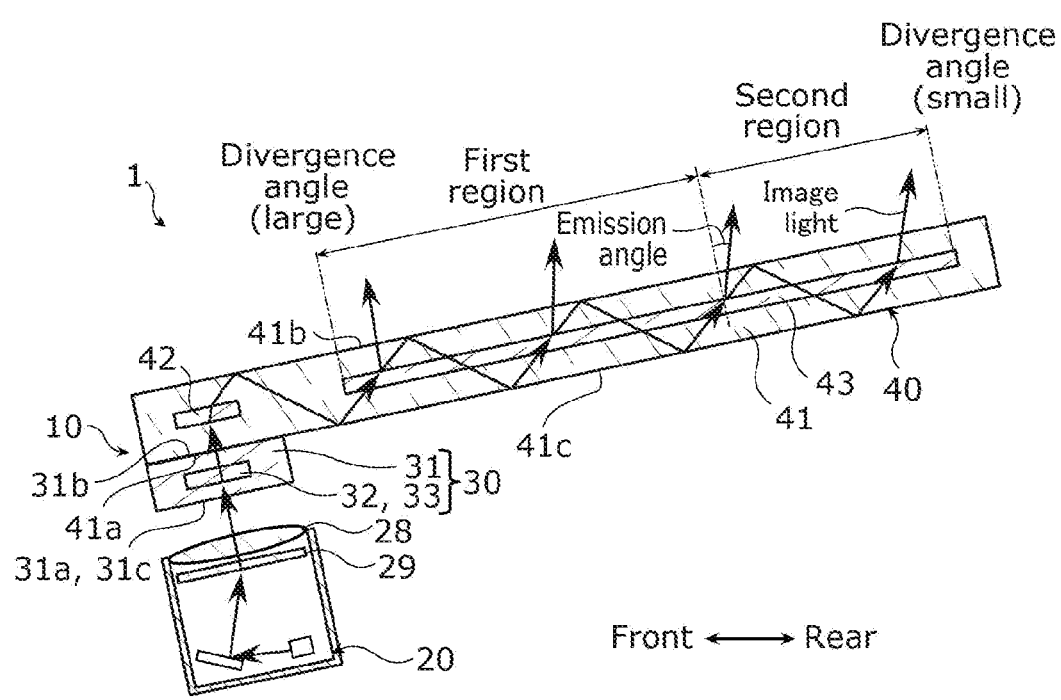
FIG. 2 is a magnified cross-sectional view in which the display device according to the embodiment is magnified.

FIG. 2 is a magnified cross-sectional view of display device 1 according to the embodiment which is magnified.

As illustrated in FIG. 1A and FIG. 2, display device 1 includes image light emitter 20 and light guide body 10 including first light guide body 30 and second light guide body 40.

<Image Light Emitter 20>

Image light emitter 20 emits image light that presents an image, to project a predetermined image on front window 3 via light guide body 10. With this, the image light is reflected by front window 3, as a result of which a virtual image is perceived. Image light emitter 20 emits the image light from emission surface portion 29. The image light emitted from emission surface portion 29 of image light emitter 20 enters and passes through first light guide body 30. After that, the image light enters and passes through second light guide body 40, and emitted therefrom, so that the image light is projected on front window 3.

Figure 3A:
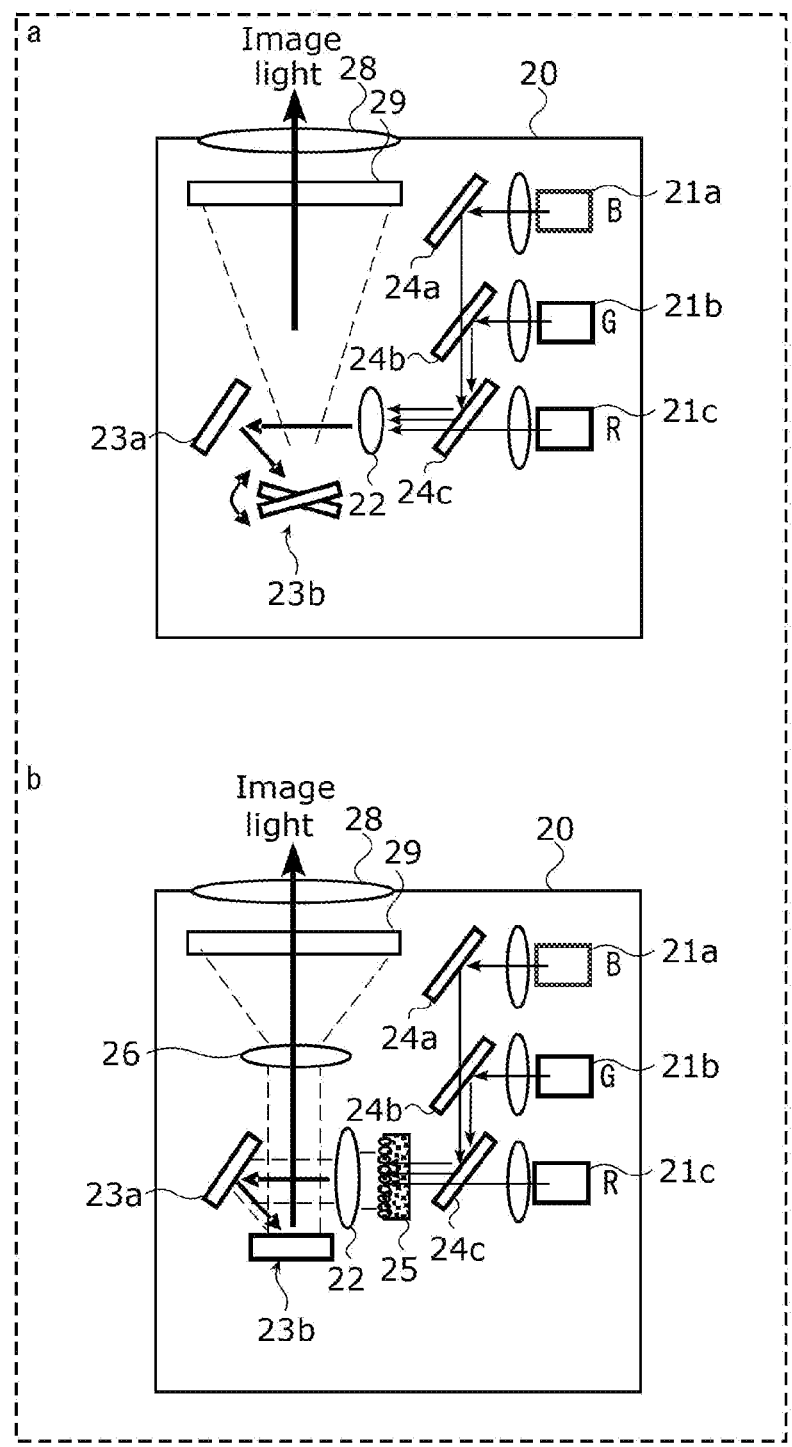
FIG. 3A is a schematic diagram illustrating examples of the configuration of an image light emitter in the display device according to the embodiment.

FIG. 3A is a schematic diagram illustrating examples of the configuration of image light emitter 20 in display device 1 according to the embodiment. a in FIG. 3A illustrates the case of using micro electro mechanical system (MEMS) mirror as second mirror 23b for image light emitter 20. B in FIG. 3A illustrates the case of using digital light processing (DLP) as second mirror 23b for image light emitter 20.

As illustrated in FIG. 3A, image light emitter 20 includes first emitter 21a that emits a first light beam, second emitter 21b that emits a second light beam, third emitter 21c that emits a third light beam, a plurality of dichroic mirrors, condenser lens 22, first mirror 23a, second mirror 23b, and emission surface portion 29.

The wavelength of the first light beam, the wavelength of the second light beam, and the wavelength of the third light beam are different from each other. For example, the first light beam, the second light beam, and the third light beam are a first laser beam, a second laser beam, and a third laser beam, respectively. In the present embodiment, the first light beam is a blue light beam, the second light beam is a green light beam, and the third light beam is a red light beam. The red light beam is light having a wavelength range perceivable as red. The green light beam is light having a wavelength range perceivable as green. The blue light beam is light having a wavelength range perceivable as blue.

First emitter 21a, second emitter 21b, and third emitter 21c irradiate the plurality of dichroic mirrors with light beams in one-to-one correspondence.

The present embodiment describes the case of using first dichroic mirror 24a, second dichroic mirror 24b, and third dichroic mirror 24c as the plurality of dichroic mirrors.

First dichroic mirror 24a is disposed on the first light beam emitted by first emitter 21a. The first light beam is incident on first dichroic mirror 24a via a lens. First dichroic mirror 24a reflects the first light beam to guide the first light beam to second dichroic mirror 24b. In the present embodiment, first dichroic mirror 24a has a function to reflect a light beam having the wavelength range of a blue color, and transmit a light beam having a different wavelength range (e.g., a green light beam or a red light beam).

Second dichroic mirror 24b is disposed on the second light beam emitted by second emitter 21b. The second light beam is incident on second dichroic mirror 24b via a lens, and the first light beam is incident on second dichroic mirror 24b from the first dichroic mirror 24a side. Second dichroic mirror 24b transmits the first light beam to guide the first light beam to third dichroic mirror 24c. In addition, second dichroic mirror 24b reflects the second light beam to guide the second light beam to third dichroic mirror 24c. In the present embodiment, second dichroic mirror 24b has a function to reflect a light beam having the wavelength range of a green color, and transmit a light beam having a different wavelength range (e.g., a blue light beam or a red light beam).

Third dichroic mirror 24c is disposed on the third light beam emitted by third emitter 21c. The third light beam is incident on third dichroic mirror 24c via a lens, and the first light beam and the second light beam are incident on third dichroic mirror 24c from the second dichroic mirror 24b side. Third dichroic mirror 24c transmits the third light beam to guide the third light beam to condenser lens 22. In addition, third dichroic mirror 24c reflects the second light beam and the third light beam to guide the second and third light beams to light condenser lens 22. In the present embodiment, third dichroic mirror 24c has a function to reflect a light beam having the wavelength range of a green color and a light beam having the wavelength range of a blue color, and transmit a light beam having a different wavelength range (e.g., a red light beam).

Note that digital light processing (DLP) may be used as second mirror 23b, as illustrated in b in FIG. 3A. In this case, micro-lens array 25 may be disposed between condenser lens 22 and third dichroic mirror 24c. Projection lens 26 may be disposed on the optical path between second mirror 23b and emission surface portion 29.

Condenser lens 22 is a lens that condenses, on first mirror 23a, the first light beam, the second light beam, and the third light beam which are emitted via third dichroic mirror 24c. Condenser lens 22 comprises glass, transparent resin, etc. In the present embodiment, condenser lens 22 is a convex lens, but may be a concave lens.

Condenser lens 22 is disposed on the emission direction side of the first light beam, the second light beam, and the third light beam which are emitted from third dichroic mirror 24c.

First mirror 23a reflects the first light beam, the second light beam, and the third light beam to guide these light beams to second mirror 23b.

Second mirror 23b reflects the first light beam, the second light beam, and the third light beam which are reflected by first mirror 23a, to irradiate emission surface portion 29 with the first light beam, the second light beam, and the third light beam. Second mirror 23b is, for example, a MEMS mirror, and is capable of changing, through rotation, the irradiation directions of the first light beam, the second light beam, and the third light beam.

Emission surface portion 29 is a screen of, for instance, a micro-lens array, or a liquid crystal display element such as a liquid crystal display (LCD). For example, emission surface portion 29 is a light-transmissive or light-translucent thin film transistor (TFT) liquid crystal display.

Image light, which is light transmitted as a result of the first light beam, the second light beam, and the third light beam being irradiated from the second mirror 23b side, is emitted from emission surface portion 29. Emission surface portion 29 drives together with first emitter 21a, second emitter 21b, and third emitter 21c by electric power obtained from the vehicle 2 side. Image light, which presents an image including numerals, characters, graphics, etc. and is in accordance with a control instruction from a controller mounted in vehicle 2 in FIG. 1A, is emitted from the emission surface of emission surface portion 29. The emission surface is a surface of emission surface portion 29 and faces first light guide body 30.

Emission surface portion 29 is supported by a case so that the emission surface of emission surface portion 29 faces first light guide body 30 and the rear surface of emission surface portion 29 faces second mirror 23b. Specifically, emission surface portion 29 is supported by the case so that the optical axis of the image light emitted from emission surface portion 29 and the optical axis of the image light reflected by second mirror 23b are substantially the same. The case is an accommodating body that accommodates first emitter 21a, second emitter 21b, third emitter 21c, the plurality of dichroic mirrors, condenser lens 22, first mirror 23a, second mirror 23b, emission surface portion 29, etc., and is accommodated in the dashboard of vehicle 2. In the present embodiment, telecentric lens 28 is disposed on the image light emission side of emission surface portion 29. The image light emitted from emission surface portion 29 is incident on first incident surface 31a via telecentric lens 28.

Figure 3B:
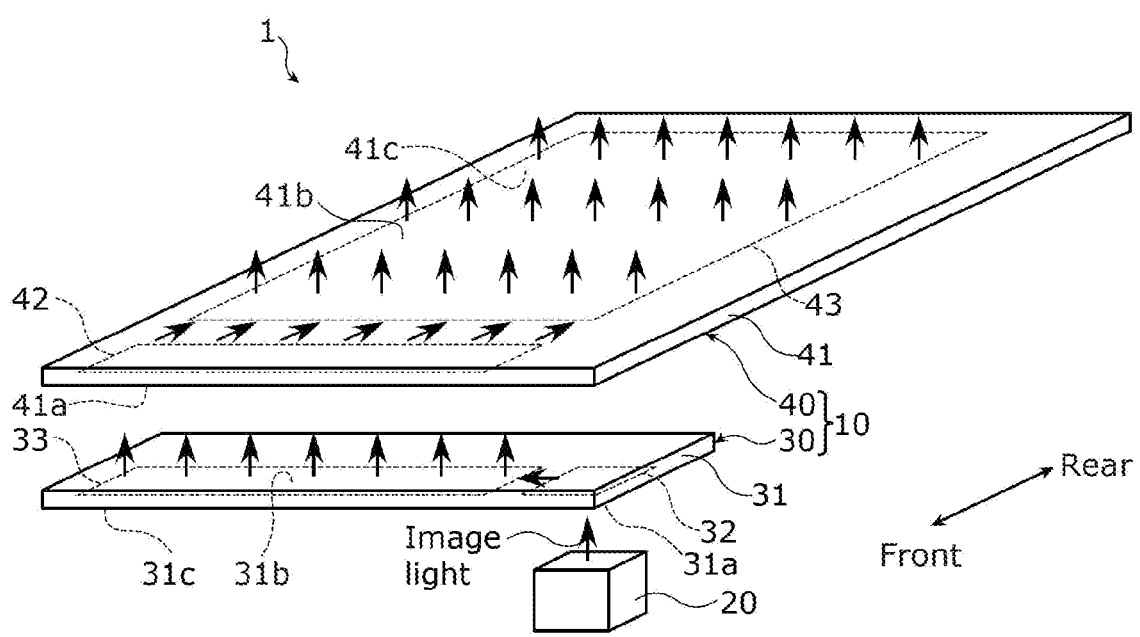
FIG. 3B is an exploded perspective view of the display device according to the embodiment which is disassembled.
Figure 4:
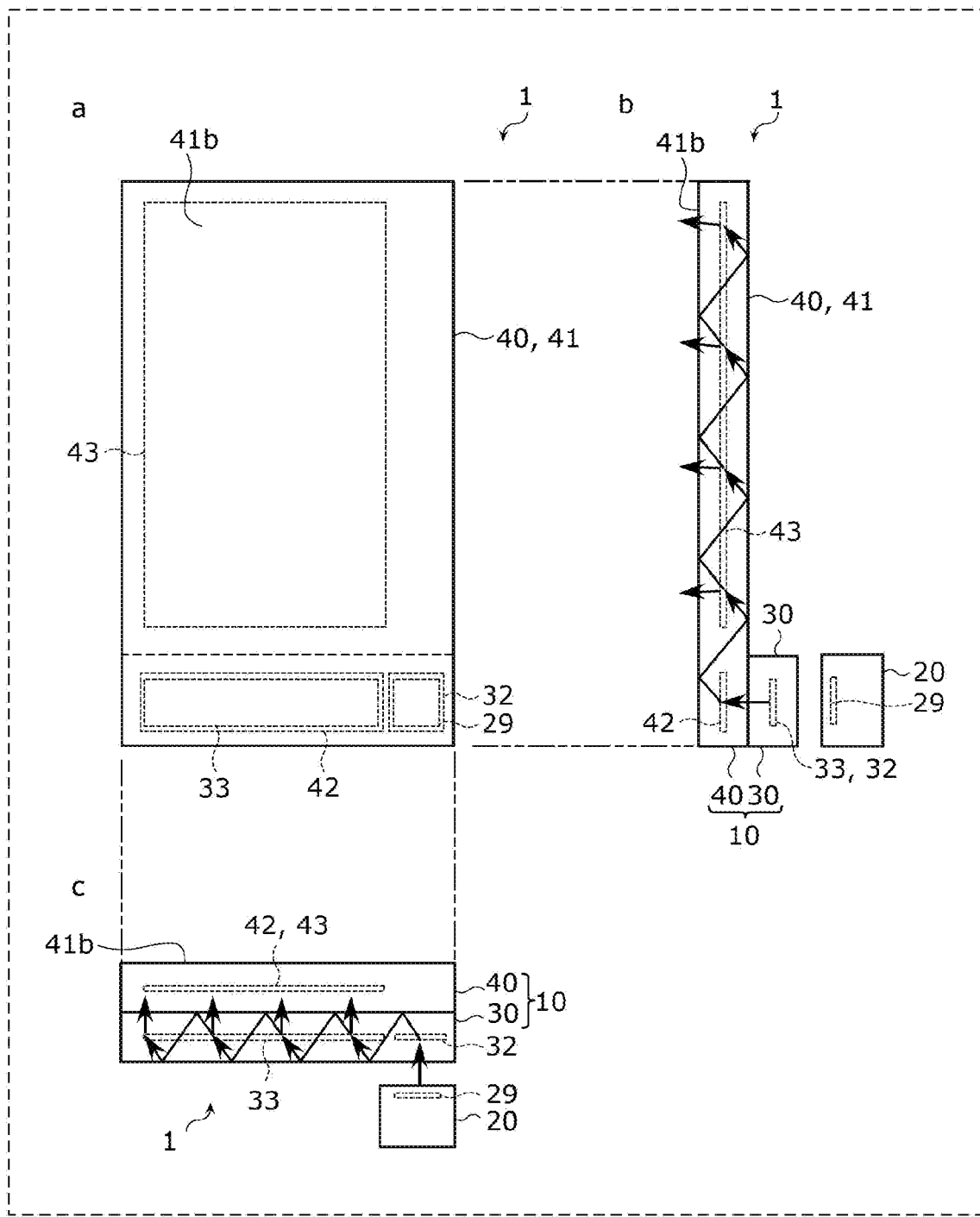
FIG. 4 is a diagram illustrating the display device according to the embodiment when viewed from each of various directions.

FIG. 3B is an exploded perspective view of display device 1 according to the embodiment which is disassembled. FIG. 4 is a diagram illustrating display device 1 according to the embodiment when viewed from each of various directions.

<First Light Guide Body 30>

As illustrated in FIG. 2 through FIG. 4, first light guide body 30 is light guide body 10 for extending, in a first direction, an image presented by image light emitted from image light emitter 20. The first direction is a direction approximately orthogonal to the optical axis of the image light emitted by image light emitter 20.

First light guide body 30 is light guide body 10 elongated in the first direction, and is fixed to second light guide body 40 to overlap second light guide body 40. First light guide body 30 is disposed so that one end of first light guide body 30 in the lengthwise direction thereof faces emission surface portion 29 of image light emitter 20.

First light guide body 30 includes first light guide plate 31, first incidence optical element 32, and first emission optical element 33.

First light guide plate 31 is a long light guide plate that is light-transmissive, faces emission surface portion 29 of image light emitter 20, and extends from first incident surface 31a in the first direction. First light guide plate 31 includes first incident surface 31a and first emission surface 31b.

Image light emitted from emission surface portion 29 is incident on first incident surface 31a. First incident surface 31a faces emission surface portion 29 and is disposed at a location that is a predetermined distance away from emission surface portion 29. First incident surface 31a is a portion of rear surface 31c of first light guide plate 31 and is a surface on one side of first light guide plate 31. Rear surface 31c is a surface of first light guide body 30 on the emission surface portion 29 side. First incident surface 31a is one example of an incident surface.

The image light that is incident on first incident surface 31a and guided inside first light guide body 30 is emitted from first emission surface 31b to second light guide body 40. First emission surface 31b faces second light guide body 40 and is disposed in close contact with second light guide body 40. First emission surface 31b is a portion of the front surface of first light guide plate 31. The front surface is a surface on the second light guide body 40 side of first light guide body 30. First emission surface 31b may be one example of an emission surface.

Each of first incidence optical element 32 and first emission optical element 33 is a plate-like light-transmissive diffractive hologram included in first light guide plate 31. First incidence optical element 32 and first emission optical element 33 are aligned in the first direction.

First incidence optical element 32 is an incidence diffractive hologram included in first light guide plate 31 to face and overlap first incident surface 31a of first light guide body 30. When overlapped with emission surface portion 29, first incidence optical element 32 has an area larger than that of the emission surface of emission surface portion 29 and covers the emission surface. First incidence optical element 32 diffracts, as diffracted light, the image light emitted from emission surface portion 29 and incident on first incident surface 31a, so that the image light is guided inside first light guide body 30 in accordance with diffraction efficiency and enters first emission optical element 33.

First emission optical element 33 is an emission diffractive hologram included in first light guide plate 31 to face and overlap first emission surface 31b of first light guide body 30. When overlapped with first emission surface 31b, first emission optical element 33 has an area smaller than that of first emission surface 31b and is covered by first emission surface 31b. First emission optical element 33 is elongated in the first direction and is disposed closer, than first incidence optical element 32 is, to the side on which the image light guided inside light guide body 10 is emitted. First emission optical element 33 is disposed along first emission surface 31b.

The image light incident on first incident surface 31a and diffracted by first incidence optical element 32 (i.e., diffracted light) enters first emission optical element 33. Every time the image light enters (passes through) first emission optical element 33 from a predetermined direction, first emission optical element 33 diffracts the image light to emit a portion of the image light at a predetermined emission angle from first emission surface 31b via first light guide plate 31. Specifically, first emission optical element 33 diffracts further the image light diffracted by first incidence optical element 32. The portion of the image light diffracted by first emission optical element 33 is emitted from first emission surface 31b. The rest of the image light is diffracted by first emission optical element 33 and emitted from emission surface 31b, while being guided inside first light guide body 30. Note that the diffraction efficiency of first emission optical element 33 may be set lower with closeness to first incidence optical element 32 and higher with a distance away from first incidence optical element 32. First emission optical element 33 plays the role of extending an image of the image light in the first direction.

<Second Light Guide Body 40>

Second light guide body 40 is light guide body 10 elongated in a second direction approximately orthogonal to the first direction and an optical axis, and first light guide body 30 is fixed so that second light guide body 40 overlaps first light guide body 30. Second light guide body 40 is disposed so that one end of second light guide body 40 in the lengthwise direction thereof faces first light guide body 30.

Second light guide body 40 includes second light guide plate 41, second incidence optical element 42, and second emission optical element 43.

Second light guide plate 41 is a long light guide plate that is light-transmissive, faces emission surface portion 29 of image light emitter 20, and extends from second incident surface 41a in the second direction. Second light guide plate 41 includes second incident surface 41a and second emission surface 41b.

Image light emitted from first emission surface 31b of first light guide plate 31 is incident on second incident surface 41a. Second incident surface 41a faces first emission surface 31b and is in close contact with first emission surface 31b. Second incident surface 41a is a portion of rear surface 41c of second light guide plate 41 and is a surface on one side of second light guide plate 41. Rear surface 41c is a surface on the first light guide body 30 side of second light guide body 40. Second incident surface 41a is one example of an incident surface.

The image light that is incident on second incident surface 41a and guided inside second light guide body 40 is emitted from second emission surface 41b to front window 3. Second emission surface 41b faces front window 3 and is a predetermined distance away from front window 3. Second emission surface 41b is a portion of a front surface of second light guide plate 41. The front surface is a surface on the front window 3 side of second light guide body 40. Second emission surface 41b is one example of an emission surface.

Each of second incidence optical element 42 and second emission optical element 43 is a plate-like light-transmissive diffractive hologram included in second light guide plate 41. Second incidence optical element 42 and second emission optical element 43 are aligned in the second direction.

Second incidence optical element 42 is an incidence diffractive hologram included in second light guide plate 41 to overlap and face second incident surface 41a of second light guide body 40.

Second incidence optical element 42 is elongated in the first direction. When overlapped with first emission optical element 33, second incidence optical element 42 has an area larger than that of first emission optical element 33 of first light guide body 30 and covers first emission optical element 33. Second incidence optical element 42 diffracts, as diffracted light, the image light emitted from first emission optical surface 31b and incident on second incident surface 41a, so that the diffracted light is guided inside second light guide body 40 in accordance with diffraction efficiency and enters second emission optical element 43.

Second emission optical element 43 is an emission diffractive hologram included in second light guide plate 41 to overlap and face second emission surface 41b of second light guide body 40. When overlapped with second emission surface 41b, second emission optical element 43 has an area smaller than that of second emission surface 41b and is covered by second emission surface 41b. Second emission optical element 43 is elongated in the second direction. Second emission optical element 43 is disposed closer, than second incidence optical element 42 is, to the side on which the image light guided inside light guide body 10 is emitted. Second emission optical element 43 is disposed along second emission surface 41b.

The image light incident on second incident surface 41a and diffracted by second incidence optical element 42 (the image light extended in the first direction) enters second emission optical element 43 from the rear surface thereof (a surface on a side opposite to the second emission surface 41b side). Every time the image light enters (passes through) second emission optical element 43 from a predetermined direction, second emission optical element 43 diffracts the image light to emit a portion of the image light at a predetermined emission angle from second emission surface 41b via second light guide plate 41. Specifically, second emission optical element 43 diffracts further the image light diffracted by second incidence optical element 42. The portion of the image light diffracted by second emission optical element 43 is emitted from second emission surface 41b via second light guide plate 41. The rest of the image light is diffracted by second emission optical element 43 and emitted from second emission surface 41b, while being guided inside second light guide body 40.

An emission angle is an angle of emitted light relative to a normal (indicated by a dashed line in FIG. 2) to the emission surface of second emission optical element 43.

Figure 1B:
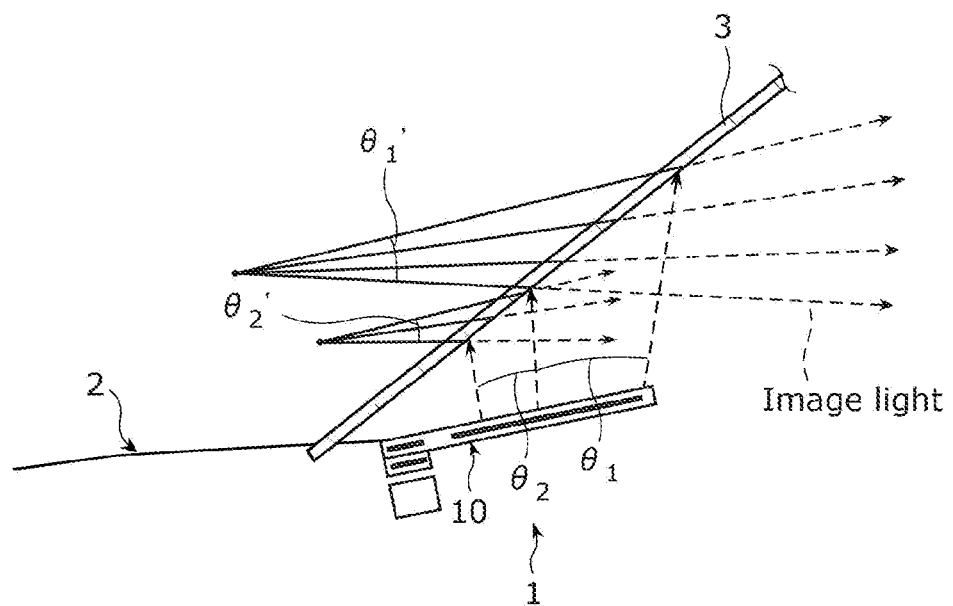
FIG. 1B is a schematic diagram illustrating divergence angles when the display device according to the embodiment and the vehicle are viewed from the side.

Moreover, second emission optical element 43 diverges the image light to be emitted, so that the emission angles of the image light in a predetermined region of second emission optical element 43 are different from each other. When second emission optical element 43 diffracts incident image light, the emission angles of the image light vary in accordance with a location on (the portion of) second emission optical element 43 at which the image light is diffracted. Accordingly, the emission angle of a portion of the image light diffracted by second emission optical element 43 varies. FIG. 1A shows divergence angle $\theta$. Divergence angle $\theta$ is determined in accordance with the degree of variation in the emission angles. In other words, by varying divergence angle $\theta$, it is possible to change divergence angle $\theta'$ of a virtual image and achieve a finite, which means not being infinite, display distance (a viewing distance), thereby enhancing visibility. By dividing second emission optical element 43 into a plurality of regions for the divergence angle, divergence angle θ is changed to divergence angle $θ_1$ (e.g., in the second region) or divergence angle $θ_2$ (e.g., in the first region) for each of the regions, for example, in two regions shown in FIG. 1B or FIG. 2. In other words, the divergence angle varies from region to region. The divergence angles are different because the degree of variation in the emission angles varies from region to region. The degree of variation here is, for example, an index presenting a variation in a range from the smallest emission angle to the largest emission angle in each region. Accordingly, varying divergence angle $θ'_1$ and divergence angle $θ'_2$ of a virtual image and varying a display distance (making a display distance different) between two different regions can enhance visibility. The details will be explained in the section of <Display Modes> which is to be described later. FIG. 1B is a schematic diagram illustrating divergence angles when display device 1 according to the embodiment and vehicle 2 are viewed from the side.

Second emission optical element 43 plays the role of extending, in the second direction, the image light extended in the first direction. In other words, second emission optical element 43 extends an image presented by the image light emitted by image light emitter 20, to emit the image light of an enlarged image.

<Operation>

With such display device 1 as described above, image light emitted from the emission surface of image light emitter 20 is incident on first incident surface 31a of first light guide plate 31, guided inside first light guide plate 31, and then enters first incidence optical element 32. The image light that has entered first incidence optical element 32 is diffracted by first incidence optical element 32, guided inside first light guide plate 31, and then enters first emission optical element 33. A portion of the image light that has entered first emission optical element 33 is diffracted by first emission optical element 33 and emitted from first emission surface 31b. The rest of the image light is guided inside first light guide plate 31 (and then reflected by the front surface or the rear surface of first light guide plate 31), and after that, enters first emission optical element 33 again. In this way, the diffraction and the emission of a portion of the image light are repeated by first emission optical element 33 so that the image light emitted by image light emitter 20 is extended in the first direction.

The image light emitted from first emission surface 31b of first light guide body 30 is incident on second incident surface 41a of second light guide plate 41, guided inside second light guide plate 41, and then enters second incidence optical element 42. The image light that has entered second incidence optical element 42 is diffracted by second incidence optical element 42, guided inside second light guide plate 41, and then enters second emission optical element 43. A portion of the image light that has entered second emission optical element 43 is diffracted by second emission optical element 43 and emitted from second emission surface 41b. The rest of the image light is guided inside second light guide plate 41 (and then reflected by the front surface or the rear surface of second light guide plate 41), and after that, enters second emission optical element 43 again. In this way, the diffraction and the emission of a portion of the image light are repeated by second emission optical element 43 so that the image light emitted by first light guide body 30 is extended in the second direction. In other words, second emission optical element 43 emits the image light of an image enlarged by extending, further to the second direction, the image presented by the image light emitted by image light emitter 20.

The image light emitted from second emission optical element 43 is guided inside second light guide plate 41 and emitted from second emission surface 41b of second light guide plate 41. The image light emitted from second emission surface 41b of second light guide plate 41 is incident on and reflected by front window 3, and emitted toward the user in vehicle 2. The user can therefore see a virtual image displayed by display device 1 and overlapped with front scenery seen from front window 3 in the traveling direction of vehicle 2.

<Display Modes>

Next, display modes to be used when display device 1 according to the present embodiment displays an image by projecting image light on front window 3 will be described.

Figure 5:
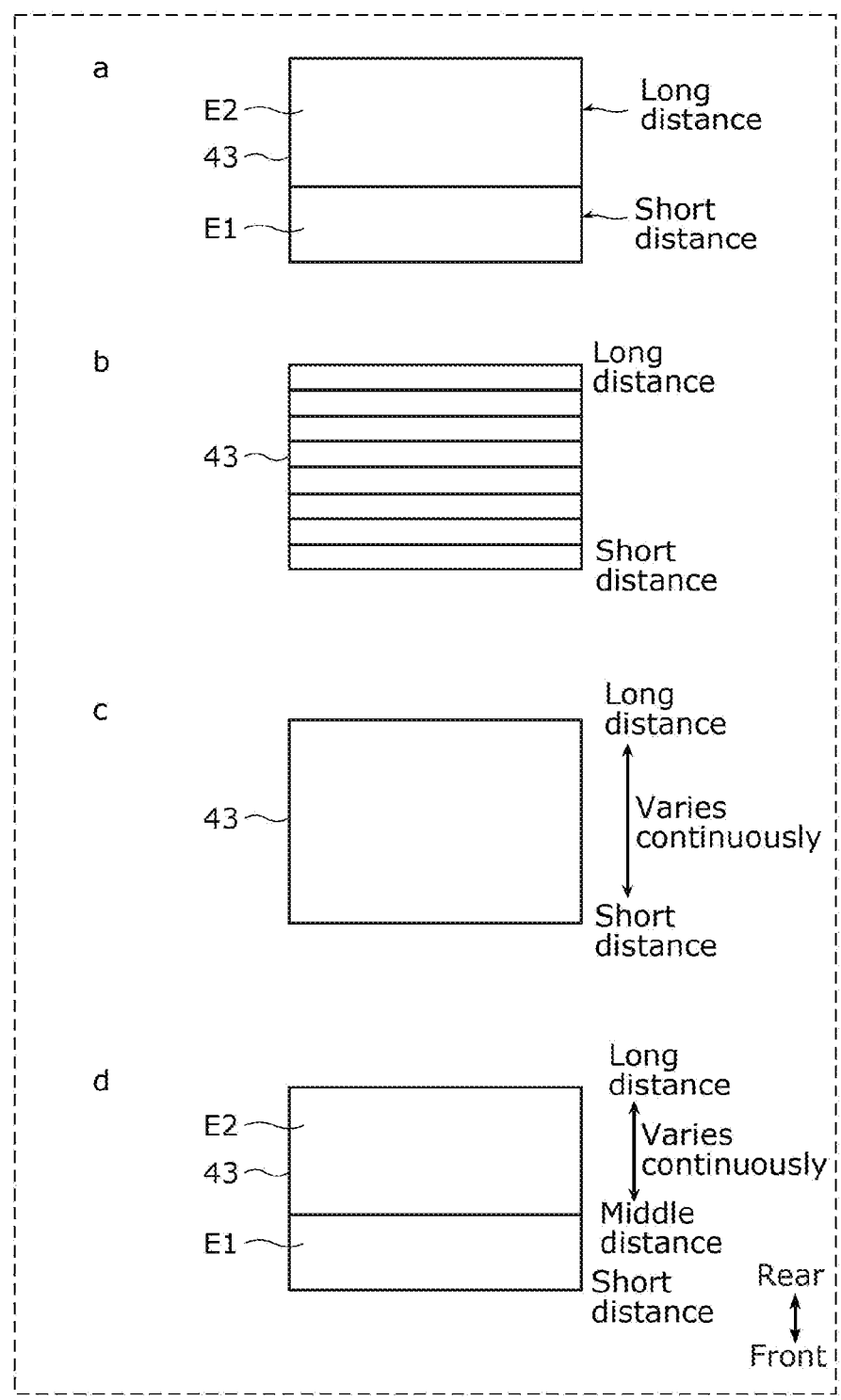
FIG. 5 is a diagram illustrating a case where the degree of divergence of a second emission optical element in the display device according to any one of Examples 1 to 4 of the embodiment varies from region to region of the second emission optical element.

FIG. 5 is a diagram illustrating the case of varying, from region to region, the degree of divergence of second emission optical element 43 in display device 1 according to Examples 1 to 4 of the embodiment. FIG. 5 shows that the degree of divergence varies from predetermined region to predetermined region in accordance with the location of a virtual image.

a in FIG. 5 illustrates the case of dividing second emission optical element 43 into two regions having different degrees of divergence. As illustrated in a in FIG. 5, second emission optical element 43 includes, as predetermined regions, first region E1 having a predetermined degree of divergence and second region E2 having a degree of divergence less than the predetermined degree of divergence. In other words, second emission optical element 43 is divided into first region E1 on the front side and second region E2 on the rear side having different degrees of divergence. Second emission optical element 43 decreases a display distance by increasing the degree of divergence in first region E1, and increases the display distance by decreasing the degree of divergence in second region E2. In the present embodiment, the lower side of the field of view on front window 3 (the short-distance side of scenery for the user) is irradiated with image light emitted from first region E1, while the upper side of the field of view on front window 3 (the long-distance side of scenery for the user) is irradiated with image light emitted from second region E2.

The degree of divergence presents how much image light is diverged and means a divergence angle. The expression "a divergence angle is large" means that the acute angle (divergence angle) between the direction of light emitted from the front edge of first region E1 and the direction of light emitted from the rear edge of first region E1 is larger than the acute angle (divergence angle) between the direction of light emitted from the front edge of second region E2 and the direction of light emitted from the rear edge of second region E2, as illustrated in FIG. 2, for example.

Note that the degrees of divergence in first region E1 are same and the degrees of divergence in second region E2 are same. Depending on the usage mode of display device 1, however, the degrees of divergence may be changed in reverse order in the front-and-rear direction of second emission optical element 43, or the degree of divergence on the left side may be increased while the degree of divergence on the right side is decreased, or the degree of divergence on the left side may be decreased while the degree of divergence on the right side is increased in the left-and-right direction of second emission optical element 43.

b in FIG. 5 illustrates the case of stepwisely varying the degree of divergence of second emission optical element 43. As illustrated in b in FIG. 5, second emission optical element 43 includes a plurality of sub-regions obtained by dividing second emission optical element 43 into strips. In other words, each of the plurality of sub-regions is of a strip shape. In the present embodiment, second emission optical element 43 is divided into three or more sub-regions having different degrees of divergence. In the present embodiment, eight sub-regions are in the shape of strips elongated along the left-and-right direction relative to the traveling direction of vehicle 2.

Second emission optical element 43 stepwisely decreases a display distance by increasing the degree of divergence for a region closer to the front edge of second emission optical element 43. Stated differently, second emission optical element 43 stepwisely increases the display distance by decreasing the degree of divergence for a region closer to the rear edge of second emission optical element 43. In the present embodiment, the lower edge side of the field of view on front window 3 (the short-distance side of scenery for the user) is irradiated with image light emitted from a region closest to the front edge of second emission optical element 43, while the upper edge side of the field of view on front window 3 (the long-distance side of scenery for the user) is irradiated with image light emitted from a region closest to the rear edge of second emission optical element 43.

Note that the degrees of divergence in each of the regions are same, but depending on the usage mode of display device 1, the degrees of divergence may be changed in reverse order in the front-and-rear direction of second emission optical element 43, or the degree of divergence may be increased with closeness to the left edge and decreased with closeness to the right edge, or the degree of divergence may be decreased with closeness to the left edge and increased with closeness to the right edge in the left-and-right direction of second emission optical element 43.

c in FIG. 5 illustrates the case of continuously (in gradation) varying the degree of divergence of second emission optical element 43. As illustrated in c in FIG. 5, the degree of divergence of image light continuously varies across adjacent regions among a plurality of predetermined regions of second emission optical element 43. Stated differently, the degree of divergence of second emission optical element 43 continuously varies across two adjacent regions among a plurality of strip-shaped regions as illustrated in b in FIG. 5. For example, second emission optical element 43 decreases a display distance by continuously increasing the degree of divergence with closeness to an edge on the front side of second emission optical element 43. Stated differently, second emission optical element 43 increases the display distance by continuously decreasing the degree of divergence with closeness to an edge on the rear side of second emission optical element 43. In other words, the degree of divergence of image light is the lowest at an edge on the rear side of second emission optical element 43. In the present embodiment, the lower edge side of the field of view on front window 3 (the short-distance side of scenery for the user) is irradiated with image light emitted from a region closest to the front edge of second emission optical element 43, while the upper edge side of the field of view on front window 3 (the long-distance side of scenery for the user) is irradiated with image light emitted from a region closest to the rear edge of second emission optical element 43.

Note that depending on the usage mode of display device 1, the degrees of divergence may be changed in reverse order in the front-and-rear direction of second emission optical element 43, or the degree of divergence may be increased with closeness to the left edge and decreased with closeness to the right edge, or the degree of divergence may be decreased with closeness to the left edge and increased with closeness to the right edge in the left-and-right direction of second emission optical element 43. In the present embodiment, the degree of divergence of image light is the lowest at an edge on the rear side (one example of decreasing the degree of divergence at an edge on one side), but the degree of divergence of image light may be the lowest at an edge on the front side, or at an edge on the left side or the right side.

d in FIG. 5 shows the case of continuously varying the degree of divergence in the second region of second emission optical element 43. As illustrated in d in FIG. 5, second emission optical element 43 has first region E1 and second region E2, as is the case of a in FIG. 5. Second region E2 in d in FIG. 5 further includes a plurality of sub-regions and the degree of divergence continuously varies across the plurality of sub-regions. Stated differently, the degree of divergence of second emission optical element 43 continuously varies across two adjacent sub-regions among a plurality of strip-shaped sub-regions as illustrated in b in FIG. 5.

For example, by increasing the degree of divergence in first region E1, second emission optical element 43 emits image light with a larger divergence angle than image light emitted from any sub-region in second region E2 (i.e., decreases a display distance). Moreover, by continuously increasing the degree of divergence in second region E2 with closeness to an edge on the front side of second emission optical element 43, second emission optical element 43 decreases the display distance. Stated differently, by continuously decreasing the degree of divergence with closeness to an edge on the rear side of second emission optical element 43, second emission optical element 43 increases the display distance.

In the present embodiment, the lower side of the field of view on front window 3 (the short-distance side of scenery for the user) is irradiated with image light emitted from first region E1. The middle portion of the field of view on front window 3 (the middle-distance side of scenery for the user) is irradiated with image light emitted from a region closest to the front edge of second region E2, and the upper edge side of the field of view on front window 3 (the long-distance side of scenery for the user) is irradiated with image light emitted from a region closest to the rear edge of second region E2.

Note that the degrees of divergence in first region E1 are same, but depending on the usage mode of display device 1, the degrees of divergence may be changed in reverse order in the front-and-rear direction of second emission optical element 43, or the degree of divergence on the left side may be increased while the degree of divergence on the right side is decreased, or the degree of divergence on the left side may be decreased while the degree of divergence on the right side is increased in the left-and-right direction of second emission optical element 43.

Note that a through d in FIG. 5 are mere examples and the present disclosure is not limited to these examples.

Comparative Example

Next, display device 9 according to a comparative example will be described.

Elements identical to the elements described in the present embodiment are assigned with like reference signs, and description is omitted where necessary.

Figure 6:
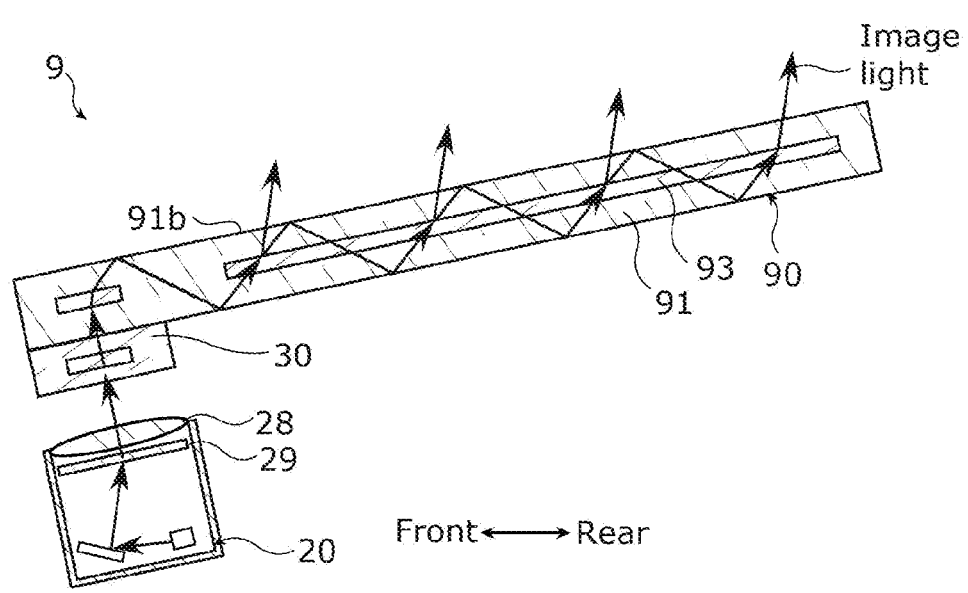
FIG. 6 is a magnified cross-sectional view of a display device according to a comparative example which is magnified.

FIG. 6 is a magnified cross-sectional view of display device 9 according to the comparative example which is magnified.

Display device 9 according to the comparative example includes image light emitter 20 and a light guide body including first light guide body 30 and second light guide body 90.

Second light guide body 90 includes, for instance, second light guide plate 91 and second emission optical element 93. Image light emitted by image light emitter 20 enters second light guide plate 91 via, for instance, first light guide body 30, and is guided inside second light guide plate 91. Second emission optical element 93 diffracts the guided light to emit light from second emission surface 91b. Every time the image light enters (passes through) second emission optical element 93 from a predetermined direction, second emission optical element 93 diffracts the image light at approximately the same angle in any region to emit a portion of the diffracted light from second emission surface 91b. Divergence angle θ in FIG. 1A is therefore substantially 0 degrees. Accordingly, substantially parallel rays of the image light are emitted from second emission surface 91b of second light guide body 90. The image light emitted by display device 9 according to the comparative example is displayed as a virtual image by being projected on the front window of a vehicle. The display distance of the substantially parallel rays of the image light, however, becomes infinite, and this reduces visibility in viewing the virtual image via a display medium.

<Operational Effects>

Next, the operational effects of display device 1 according to the present embodiment will be described.

With a display device for which the holographic diffractive optical element according to PTL 1 is used, since the optical element diffracts image light at approximately the same angle, the divergence angle of the image light guided inside a light guide body serving as the light guide member is substantially 0 degrees (the rays of the image light emitted from the light guide body are substantially parallel to each other) due to the optical element. Accordingly, a display distance becomes infinite and visibility is reduced when viewing a video via a display medium.

In contrast, display device 1 according to the present embodiment (i) includes light guide body 10 and image light emitter 20 which emits image light that presents an image, and (ii) displays a virtual image which corresponds to the image presented by the image light emitted from light guide body 10, as described above. Light guide body 10 includes first incident surface 31a which the image light emitted by image light emitter 20 is incident on, and second emission surface 41b which the image light incident on first incident surface 31a and guided inside second light guide plate 41 is emitted from. Light guide body 10 includes second emission optical element 43 that is disposed along second emission surface 41b and diffracts the image light to emit a portion of the image light at a predetermined emission angle every time the image light enters second emission optical element 43 from a predetermined direction. Second emission optical element 43 has a plurality of predetermined regions. The image light is diverged by being emitted from second emission optical element 43 so that the predetermined emission angle varies in accordance with a location in one predetermined region included in the plurality of predetermined regions of second emission optical element 43. The degree of divergence indicating how much the image light is diverged varies between the one predetermined region and other predetermined region included in the plurality of predetermined regions in accordance with the location of the virtual image.

Accordingly, every time image light enters second emission optical element 43, second emission optical element 43 diffracts the image light and diverges the image light so that the emission angle of a portion of the image light varies in accordance with a location in one predetermined region included in the plurality of predetermined regions of second emission optical element 43 for an image presented by the diffracted image light. In other words, second emission optical element 43 is capable of varying, in accordance with a location on second emission surface 41b, the emission angle of a portion of the image light emitted from second emission surface 41b of light guide body 10, by making the emission angle of a portion of the image light different (varied) in accordance with a location on second emission optical element 43. Second emission optical element 43 can therefore achieve a finite display distance. By making the divergence angle of a virtual image different (varied) in accordance with a location in each of the predetermined regions, the degree of divergence indicating how much the image light is diverged can also be different. This can achieve varying a display distance in accordance with each of the predetermined regions.

Accordingly, with display device 1 described above, it is possible to inhibit reduction in visibility.

In display device 1 according to the present embodiment, second emission optical element 43 includes first region E1 having a predetermined degree of divergence and being included in the plurality of predetermined regions, and second region E2 having a degree of divergence less than the predetermined degree of divergence and being included in the plurality of predetermined regions. Second region E2 further includes a plurality of sub-regions, and the degree of divergence continuously varies across the plurality of sub-regions.

It is possible, for example, to place first region E1 having a large degree of divergence on the front side of the traveling direction of vehicle 2 and place second region E2 having a small degree of divergence on the rear side of the traveling direction of vehicle 2. Accordingly, the lower side of front window 3 can be irradiated with image light having a large degree of divergence since the user sees a short-distance view. The upper side (or approximately the middle portion) of front window 3 can be irradiated with image light having a small degree of divergence since the user sees a long-distance view. In other words, display device 1 is capable of displaying, at a long distance on front scenery seen from front window 3, an image presented by image light with a small degree of divergence, and displaying, at a short distance on front scenery seen from front window 3, an image presented by image light with a large degree of divergence. It is therefore possible to surely inhibit reduction in visibility.

According to display device 1 of the present embodiment, the degree of divergence continuously varies across adjacent regions among the plurality of predetermined regions.

Accordingly, it is possible to continuously vary the degree of divergence of image light to be projected on front window 3. Display device 1 is therefore capable of more surely inhibiting reduction in visibility.

In the display device according to the embodiment, each of the plurality of predetermined regions is of a strip shape.

Accordingly, it is possible to stepwise vary the degree of divergence of image light to be projected on front window 3. Display device 1 is therefore capable of more surely inhibiting reduction in visibility.

In display device 1 according to the present embodiment, the degree of divergence of image light at an edge on one side of second emission optical element 43 is the lowest.

Accordingly, it is possible to continuously vary the degree of divergence of image light for a portion of front window 3 where the image light is to be projected. Display device 1 is therefore capable of more surely inhibiting reduction in visibility.

With display device 1 according to the present embodiment, image light is reflected by front window 3, as a result of which the virtual image of the image light is perceived.

Accordingly, the user can see a virtual image displayed by display device 1 and overlapped on front scenery seen from front window 3 in the traveling direction of vehicle 2.

Variation 1

The configuration of display device 1a according to the present variation will be described.

Figure 7:
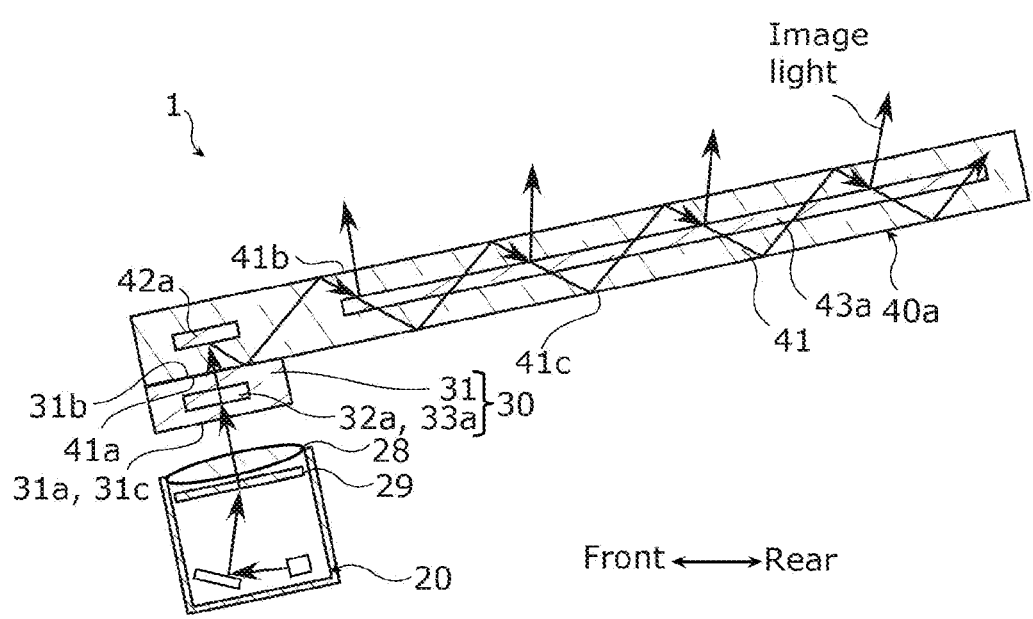
FIG. 7 is a magnified cross-sectional view of a display device according to Variation 1 which is magnified.

FIG. 7 is a magnified cross-sectional view of display device 1a according to Variation 1 which is magnified.

In the present variation, first incidence optical element 32a, first emission optical element 33a, second incidence optical element 42a, and second emission optical element 43a are of reflection type, which is different from the first incidence optical element, the first emission optical element, the second incidence optical element, and the second emission optical element according to the embodiment. The other elements according to the present variation are same as those described in the embodiment unless otherwise stated, and are assigned with like reference signs so that detailed description regarding the other elements is omitted.

According to the present variation, when image light diffracted by second incidence optical element 42a according to the present variation enters second emission optical element 43a from the rear surface thereof, second emission optical element 43a allows all of the diffracted light to be guided inside second light guide plate 41 and to enter second emission optical element 43a from the front surface thereof. A portion of the image light that has entered from the front surface of second emission optical element 43a is reflected and emitted from second emission surface 41b via second light guide body 40a, and the rest of the image light is diffracted. In other words, second emission optical element 43a is a light-transmissive diffractive hologram included in second light guide plate 41.

Note that image light emitter 20 may be provided on the second emission surface 41b side of second light guide body 40a (the front window 3 side).

The same operational effects as those produced by the display device according to the embodiment are achieved also by the display device according to the present variation.

Variation 2

The following describes the configuration of display device 100 according to the present variation.

Figure 8:
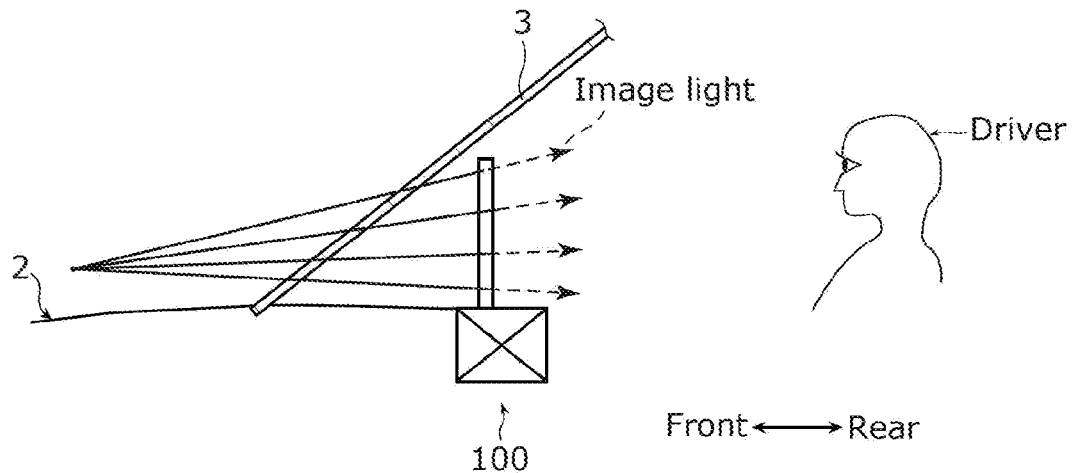
FIG. 8 is a schematic diagram illustrating a display device according to Variation 2 and the vehicle when viewed from the side.
Figure 9:
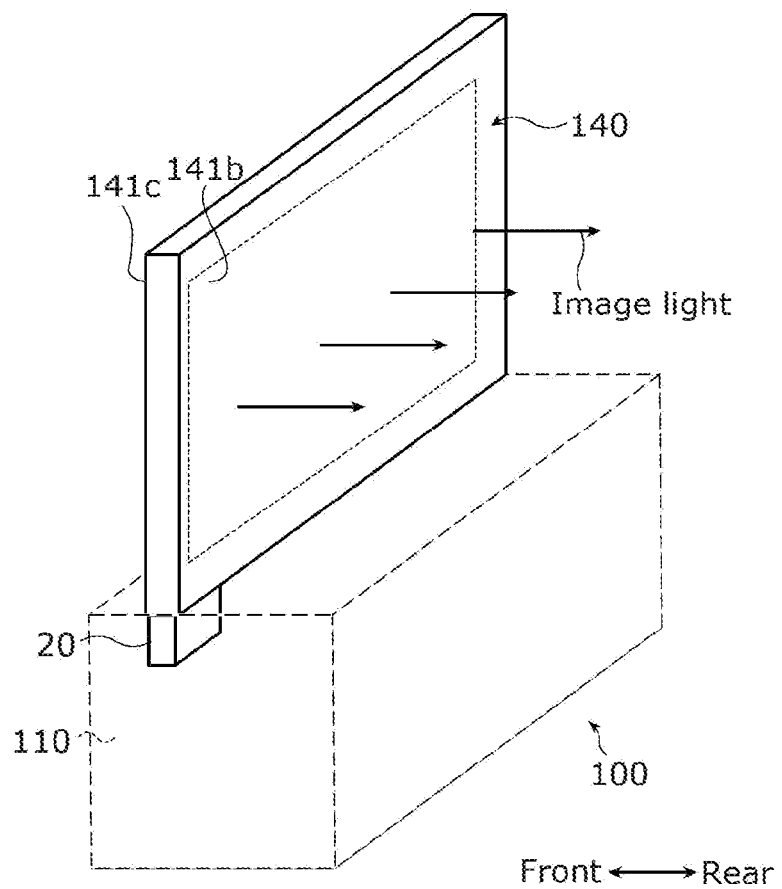
FIG. 9 is a perspective view of the display device according to Variation 2.

FIG. 8 is a schematic diagram illustrating display device 100 according to Variation 2 and vehicle 2 when viewed from the side. FIG. 9 is a perspective view of display device 100 according to Variation 2.

Display device 100 according to the present variation is a headup display including combiner 140, which is different from the display device according to the embodiment. The other elements according to the present variation are same as those described in the embodiment unless otherwise stated, and are assigned with like reference signs so that detailed description regarding the other elements is omitted.

Display device 100 according to the present variation includes device body 110, image light emitter 20 disposed inside device body 110, and combiner 140 that is light-transmissive and emits image light emitted from image light emitter 20, as illustrated in FIG. 8 and FIG. 9.

Device body 110 is placed and fixed in the dashboard of vehicle 2. Image light emitter 20 is placed at an edge of combiner 140, and allows image light to enter from a surface at the edge of combiner 140 (one example of an incident surface) to display an image on combiner 140. Combiner 140 is different from light guide body 10 according to the embodiment in that image light is incident on the edge surface of combiner 140, which is a lateral surface of combiner 140, but the configuration of combiner 140 is same as that of light guide body 10 according to the embodiment.

Emission surface 141b of combiner 140 is a surface facing the user and an image is displayed on emission surface 141b. Surface 141c opposite to emission surface 141b of combiner 140 is a surface facing front window 3 and light including scenery is incident on surface 141c from front via front window 3. Combiner 140 has the same configuration as that of a light guide body, and is one example of a light guide body.

The user can see a virtual image displayed on combiner 140 and overlapped with front scenery seen from front window 3 in the traveling direction of vehicle 2.

In the present variation, if image light is displayed as-is like the case described in the embodiment, an image is inverted. This is because display device 100 according to the present variation is not configured to display a virtual image as the result of image light reflecting off front window 3, unlike display device 1 according to the embodiment. Accordingly, image light emitter 20 in display device 100 according to the present variation emits image light that presents an image which is inverted, so that the image is not inverted when displayed, as a variation of the embodiment.

The display mode in this case increases the degree of divergence of image light on the lower side of the field of view on combiner 140 (vertically lower side and the short-distance side of scenery for the user) and decreases the degree of divergence of image light on the upper side of the field of view on combiner 140 (vertically upper side and the long-distance side of scenery for the user).

The same operational effects as those produced by the display device according to the embodiment are achieved also by the display device according to the present variation.

Variation 3

The following describes the configuration of display device 200 according to the present variation.

Figure 10:
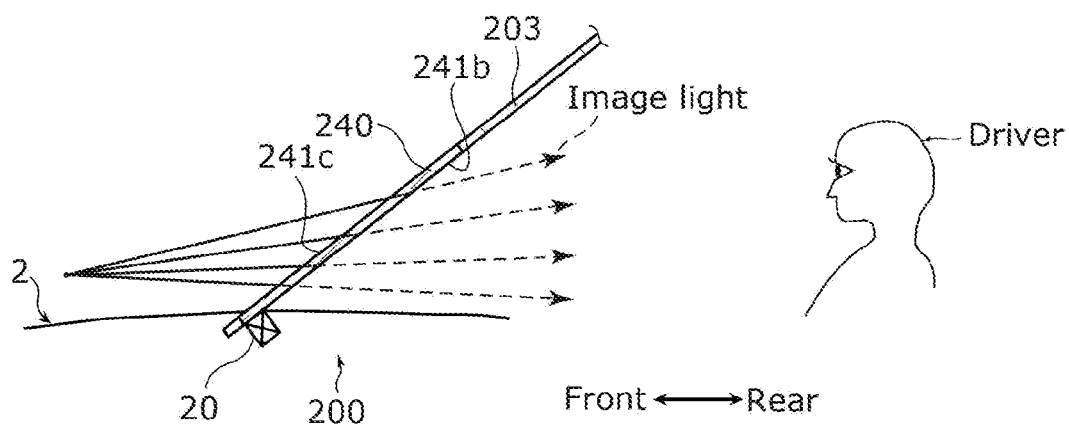
FIG. 10 is a schematic diagram illustrating a display device according to Variation 3 and the vehicle when viewed from the side.

FIG. 10 is a schematic diagram illustrating display device 200 according to Variation 3 and vehicle 2 when viewed from the side.

In the present variation, light guide body 240 in display device 200 serves also as front window 203, which is different from the display device according to the embodiment. The other elements according to the present variation are same as those described in the embodiment unless otherwise stated, and are assigned with like reference signs so that detailed description regarding the other elements is omitted.

Display device 200 according to the present variation includes image light emitter 20 and light guide body 240, as illustrated in FIG. 10.

Light guide body 240 is provided at front window 203. In other words, light guide body 240 may be configured using a portion of front window 203 or may be embedded as a member separate from front window 203. Front window 203 may be one example of a light guide body.

Image light emitter 20 is provided and fixed on the inner surface of front window 203 (light guide body 240) on the vehicle interior side. Image light emitter 20 is placed in the dashboard of vehicle 2. Image light emitter 20 allows image light to enter light guide body 240 (the inner surface of front window 203), to display an image on light guide body 240.

Emission surface 241b of light guide body 240 is a surface facing the user and an image is displayed on emission surface 241b. Surface 241c opposite to emission surface 241b of light guide body 240 is the outer surface of front window 203, and light including scenery is incident on surface 241c from front via light guide body 240.

The user can see a virtual image displayed on light guide body 240 and overlapped with front scenery seen via light guide body 240 in the traveling direction of vehicle 2.

Display device 200 according to the present variation, like display device 100 according to Variation 2, is not configured to display a virtual image as the result of image light reflecting off front window 3. The configuration of display device 200 is therefore same as that of display device 100 according to Variation 2.

Variation 4

The configuration of display device 300 according to the present variation will be described.

Figure 11:
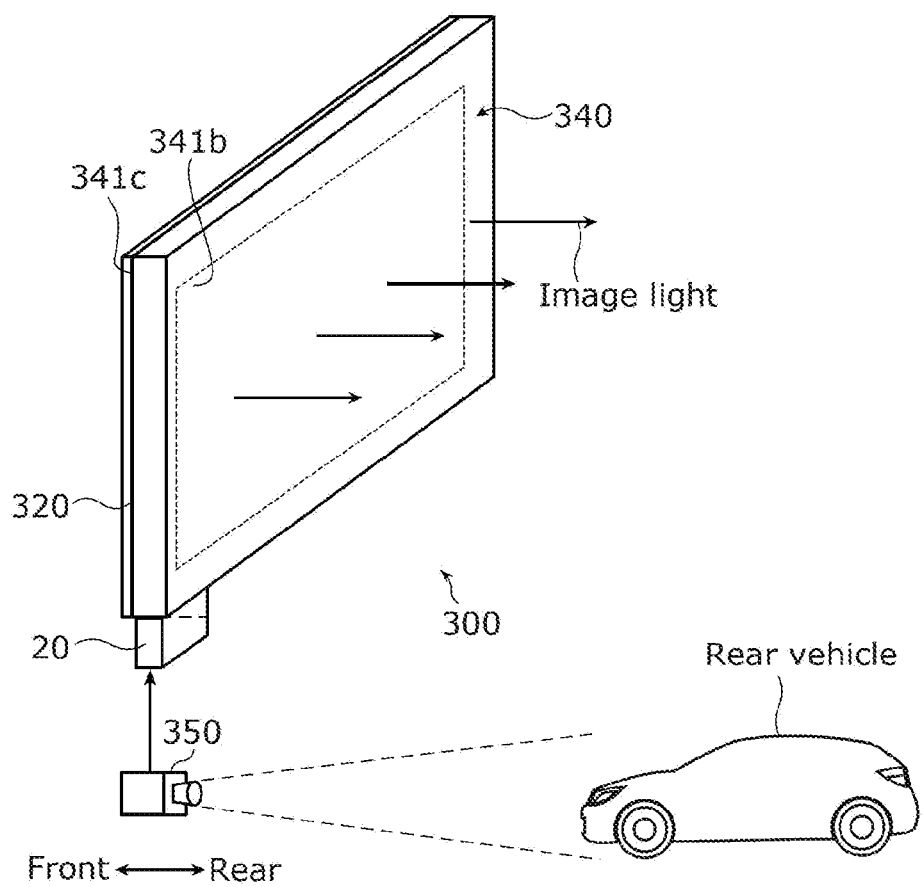
FIG. 11 is a schematic diagram illustrating a display device according to Variation 4 and the vehicle when viewed from the side, and a rear vehicle located behind the vehicle.

FIG. 11 is a schematic diagram illustrating display device 300 according to Variation 4 and a vehicle when viewed from the side, and a rear vehicle located behind the vehicle.

In the present variation, display device 300 is an electronic mirror, which is different from the display device according to the embodiment. The other elements according to the present variation are same as those described in the embodiment unless otherwise stated, and are assigned with like reference signs so that detailed description regarding the other elements is omitted.

According to the present variation, display device 300 and imager 350 are mounted in a display system, as illustrated in FIG. 11. Display device 300 includes image light emitter 20, light guide body 340, and shield 320.

Imager 350 is mounted in a vehicle so that the surrounding view and particularly the rear view of the vehicle can be captured. Imager 350 outputs, to image light emitter 20, the image data of an image in which the rear view of a mobile body is captured. Imager 350 is, for example, a complementary metal oxide semiconductor (CMOS) image sensor and images the rear view of the vehicle. Imager 350 is not limited to a CMOS image sensor and may be, for instance, an image sensor such as a charge coupled device (CCD) image sensor.

Image light emitter 20 obtains the image data of the image captured by imager 350, and generates image light in which an image including numerals, characters, graphics, etc. overlaps the captured image indicated by the obtained image data. Image light emitter 20 causes light guide body 340 to display the generated image light.

Shield 320 is provided on rear surface 341c opposite to emission surface 341b of light guide body 340. In the present variation, shield 320 is bonded to rear surface 341c of light guide body 340. Note that shield 320 may be a reflection mirror whose surface on the rear surface 341c side of light guide body 340 is mirror processed, and which reflects image light emitted by image light emitter 20. Accordingly, the image light is effectively emitted from emission surface 341b of light guide body 340, and therefore, an image presented by the image light is displayed on light guide body 340.

Other Variations, Etc.

The above has described the present disclosure based on the embodiment and Variations 1 through 4, but the present disclosure is not limited to, for instance, these embodiment and Variations 1 through 4.

For example, each of processing units included in the display device according to each of the embodiment and Variations 1 through 4 is typically realized as an LSI which is an integrated circuit. These circuits may be individually realized as one chip or may be realized as one chip including part or all of the circuits.

Each of the processing units to be realized as an integrated circuit is not limited to an LSI and may be realized as a dedicated circuit or a general-purpose processor. A field programmable gate array (FPGA) which can be programmed after an LSI is manufactured or a reconfigurable processor which can reconfigure connection or setting of circuit cells inside an LSI may be used.

It should be noted that in each of the embodiment and Variations 1 through 4, each of the elements may be configured by dedicated hardware or may be realized by executing a software program suitable for the element. Each of the elements may be implemented by a program executor such as a CPU or a processor reading and executing a software program recorded on a recording medium such as a hard disc or a semiconductor memory.

All the numbers used above are exemplary numbers for specifically describing the present disclosure, and numbers for implementing the present disclosure are not limited to the exemplary numbers.

Division of a functional block in each block diagram is an example, and plural functional blocks may be realized as one functional block, one functional block may be divided into plural functional blocks, or part of functions may be transferred to another functional block. Besides, single hardware or software may process, in parallel or by way of time division, functions of plural functional blocks having similar functions.

An order in which steps are executed in a flowchart is an exemplary order for specifically describing the present disclosure, and may be an order other than the order described above. Furthermore, part of the steps described above may be executed at the same time as (in parallel to) the execution of other step(s).

Forms obtained by various modifications to any of the foregoing embodiment and Variations 1 through 4 that can be conceived by a person skilled in the art as well as forms realized by arbitrarily combining elements and functions in the embodiment and Variations 1 through 4 within the scope of the essence of the present disclosure are also included in the present disclosure.

While embodiment and variations thereof have been described herein above, it is to be appreciated that various changes in form and detail may be made without departing from the spirit and scope of the present disclosure as presently or hereafter claimed.

Further Information About Technical Background to this Application

The disclosures of the following patent applications each including specification, drawings, and claims are incorporated herein by reference in their entirety: Japanese Patent Application No. 2020-060386 filed on Mar. 30, 2020, and PCT International Application No. PCT/JP2021/001118 filed on Jan. 14, 2021.

INDUSTRIAL APPLICABILITY

The present disclosure can be used, for example, for mobile bodies such as vehicles.

The invention claimed is:

1. A display device, comprising:
a light guide body; and
an image light emitter which emits image light that presents an image,
wherein the display device displays a virtual image which corresponds to the image presented by the image light emitted from the image light emitter,
the light guide body includes an incident surface which the image light emitted by the image light emitter is incident on, and an emission surface which the image light incident on the incident surface and guided inside the light guide body is emitted from,
the light guide body includes an optical element that is disposed along the emission surface and that diffracts the image light to emit a portion of the image light at a predetermined emission angle every time the image light enters the optical element from a predetermined direction,
the optical element is disposed within the light guide body,
the optical element includes a plurality of predetermined regions,
the image light is diverged by being emitted from the optical element such that the predetermined emission angle varies in accordance with a first location in a first predetermined region included in the plurality of predetermined regions of the optical element, and
a degree of divergence indicating how much the image light is diverged varies between the first predetermined region and a second predetermined region included in the plurality of predetermined regions in accordance with a second location of the virtual image.

2. The display device according to claim 1, wherein the optical element includes a first region having a first predetermined degree of divergence and being included in the plurality of predetermined regions, and a second region having a second predetermined degree of divergence less than the first predetermined degree of divergence and being included in the plurality of predetermined regions,
the second region further includes a plurality of sub-regions, and
the second predetermined degree of divergence continuously varies across the plurality of sub-regions.

3. The display device according to claim 1, wherein the degree of divergence continuously varies across adjacent regions among the plurality of predetermined regions.

4. The display device according to claim 1, wherein each of the plurality of predetermined regions is of a strip shape.

5. The display device according to claim 1, wherein the degree of divergence of the image light at an edge on one side of the optical element is lowest.

6. The display device according to claim 1, wherein the image light is reflected by a display medium, as a result of which the virtual image is perceived.

7. The display device according to claim 1, wherein the second location of the virtual image is a distance from a user.

8. The display device according to claim 1, wherein the light guide body is elongated, and the optical element is elongated in a same direction as the light guide body.

* * * * *